(12) United States Patent
Woodell et al.

(10) Patent No.: US 9,091,745 B2
(45) Date of Patent: Jul. 28, 2015

(54) OPTIMIZED TWO PANEL AESA FOR AIRCRAFT APPLICATIONS

(75) Inventors: Daniel L. Woodell, Cedar Rapids, IA (US); James B. West, Cedar Rapids, IA (US); Lee M. Paulsen, Cedar Rapids, IA (US); Michael J. Buckley, Marion, IA (US); Brian J. Herting, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 366 days.

(21) Appl. No.: 13/400,387

(22) Filed: Feb. 20, 2012

(65) Prior Publication Data

US 2013/0214972 A1 Aug. 22, 2013

(51) Int. Cl.
*H01Q 3/00* (2006.01)
*G01S 7/02* (2006.01)
*H01Q 1/28* (2006.01)
*H01Q 21/06* (2006.01)
*G01S 13/02* (2006.01)

(52) U.S. Cl.
CPC ............... *G01S 7/023* (2013.01); *H01Q 1/281* (2013.01); *H01Q 21/061* (2013.01); *G01S 2013/0245* (2013.01); *G01S 2013/0272* (2013.01)

(58) Field of Classification Search
CPC .............................. H01Q 1/281; H01Q 21/061
USPC ........................................................ 342/372
See application file for complete search history.

(56) References Cited

U.S. PATENT DOCUMENTS

| | | | | |
|---|---|---|---|---|
| 4,833,485 | A * | 5/1989 | Morgan | 343/895 |
| 5,041,835 | A * | 8/1991 | Matsumoto | 342/374 |
| 6,067,053 | A | 5/2000 | Runyon et al. | |
| 7,245,261 | B2 * | 7/2007 | Zafar et al. | 343/713 |
| 7,528,613 | B1 | 5/2009 | Thompson et al. | |
| 2010/0066631 | A1 | 3/2010 | Puzella et al. | |
| 2011/0309966 | A1 * | 12/2011 | Descharles et al. | 342/45 |

FOREIGN PATENT DOCUMENTS

JP 06283918 A * 10/1994

* cited by examiner

*Primary Examiner* — Timothy A Brainard
(74) *Attorney, Agent, or Firm* — Angel N. Gerdzhikov; Donna P. Suchy; Daniel M. Barbieri

(57) ABSTRACT

A two panel radar system is disclosed. The radar system may include a pair of AESA panels respectively positioned on either side of a central axis, wherein a pointing direction of the first AESA panel is offset by a predetermined angle in a clockwise direction with respect to the central axis and a pointing direction of the second AESA panel is offset by the predetermined angle in a counterclockwise direction with respect to the central axis. A controller may be configured for selectively activating at least one of: the first AESA panel for providing a first coverage area in a first direction offset from the central axis, the second AESA panel for providing a second coverage area in a second direction offset from the central axis, or the pair of AESA panels jointly for providing a third coverage area between the first coverage area and the second coverage area.

20 Claims, 5 Drawing Sheets

//OPTIMIZED TWO PANEL AESA FOR AIRCRAFT APPLICATIONS

TECHNICAL FIELD

The present disclosure relates generally to radar systems and more particularly to a radar system suitable for aircraft applications.

BACKGROUND

An Active Electronically Scanned Array (AESA), also known as active phased array radar is a type of phased array radar whose transmitter and receiver functions are composed of numerous small solid-state transmit/receive elements. AESA radars may be utilized in a variety of applications, including aviation and aircraft applications. Aviation and aircraft applications generally require wide azimuth coverage.

Wide azimuth coverage with an AESA has generally driven a tradeoff in off-boresight gain or required the use of additional panels whose pointing angles were spread across the desired azimuth space. This is especially true with classic aperture designs which have substantial losses when scanned away from normal to the radiating aperture. For example, to provide wide azimuth coverage, a radar system may include a forward-facing AESA panel and multiple side AESA panels (e.g., a left-facing panel, a right-facing panel and possibly even more additional panels) to help reducing off-boresight gain loss. However, each panel introduces additional cost and increases the physical space required, which may be difficult to accommodate due to the limited space available on an aircraft.

Therein lies the need to provide a radar system suitable for aircraft applications.

SUMMARY

The present disclosure is directed to a radar system for an aircraft. The radar system may include a pair of AESA panels disposed in a nosecone radome of the aircraft. The pair of AESA panels are respectively positioned on either side of a longitudinal axis of the aircraft, wherein a pointing direction of the first AESA panel is offset by a predetermined angle in a clockwise direction with respect to the longitudinal axis of the aircraft and a pointing direction of the second AESA panel is offset by the predetermined angle in a counterclockwise direction with respect to the longitudinal axis of the aircraft. The radar system may also include a controller in communication with each of the pair of AESA panels. The controller may be configured for selectively activating at least one of: the first AESA panel individually for providing a first coverage area in a first direction offset from the longitudinal axis of the aircraft, the second AESA panel individually for providing a second coverage area in a second direction offset from the longitudinal axis of the aircraft, or the pair of AESA panels jointly for providing a third coverage area between the first coverage area and the second coverage area.

A further embodiment of the present disclosure is directed to radar system. The radar system may include a pair of AESA panels. The pair of AESA panels are respectively positioned on either side of a central axis, wherein a pointing direction of the first AESA panel is offset by a predetermined angle in a clockwise direction with respect to the central axis and a pointing direction of the second AESA panel is offset by the predetermined angle in a counterclockwise direction with respect to the central axis. The radar system may also include a controller in communication with each of the pair of AESA panels. The controller may be configured for selectively activating at least one of: the first AESA panel individually for providing a first coverage area in a first direction offset from the central axis, the second AESA panel individually for providing a second coverage area in a second direction offset from the central axis, or the pair of AESA panels jointly for providing a third coverage area between the first coverage area and the second coverage area.

An additional embodiment of the present disclosure is directed to a method for providing wide azimuth coverage utilizing AESA radars. The method may include: providing a first AESA panel on a first side of a central axis, wherein a pointing direction of the first AESA panel is offset by a predetermined angle in a clockwise direction with respect to the central axis; providing a second AESA panel on a second side of the central axis, wherein a pointing direction of the second AESA panel is offset by the predetermined angle in a counterclockwise direction with respect to the central axis; and selectively activating at least one of: the first AESA panel for providing a first coverage area in a first direction offset from the central axis, the second AESA panel for providing a second coverage area in a second direction offset from the central axis, or the first AESA panel and the second AESA panel jointly for providing a third coverage area between the first coverage area and the second coverage area.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to a two panel AESA radar system suitable for aircraft applications. The two AESA panels are positioned so that their respective pointing directions are offset on either side of the forward-facing direction (with respect to the direction of travel of the aircraft). The two AESA panels may be utilized individually to provide wide azimuth angles, and they may be utilized jointly as a common antenna aperture and operate in the forward quadrant.

Figure 1:
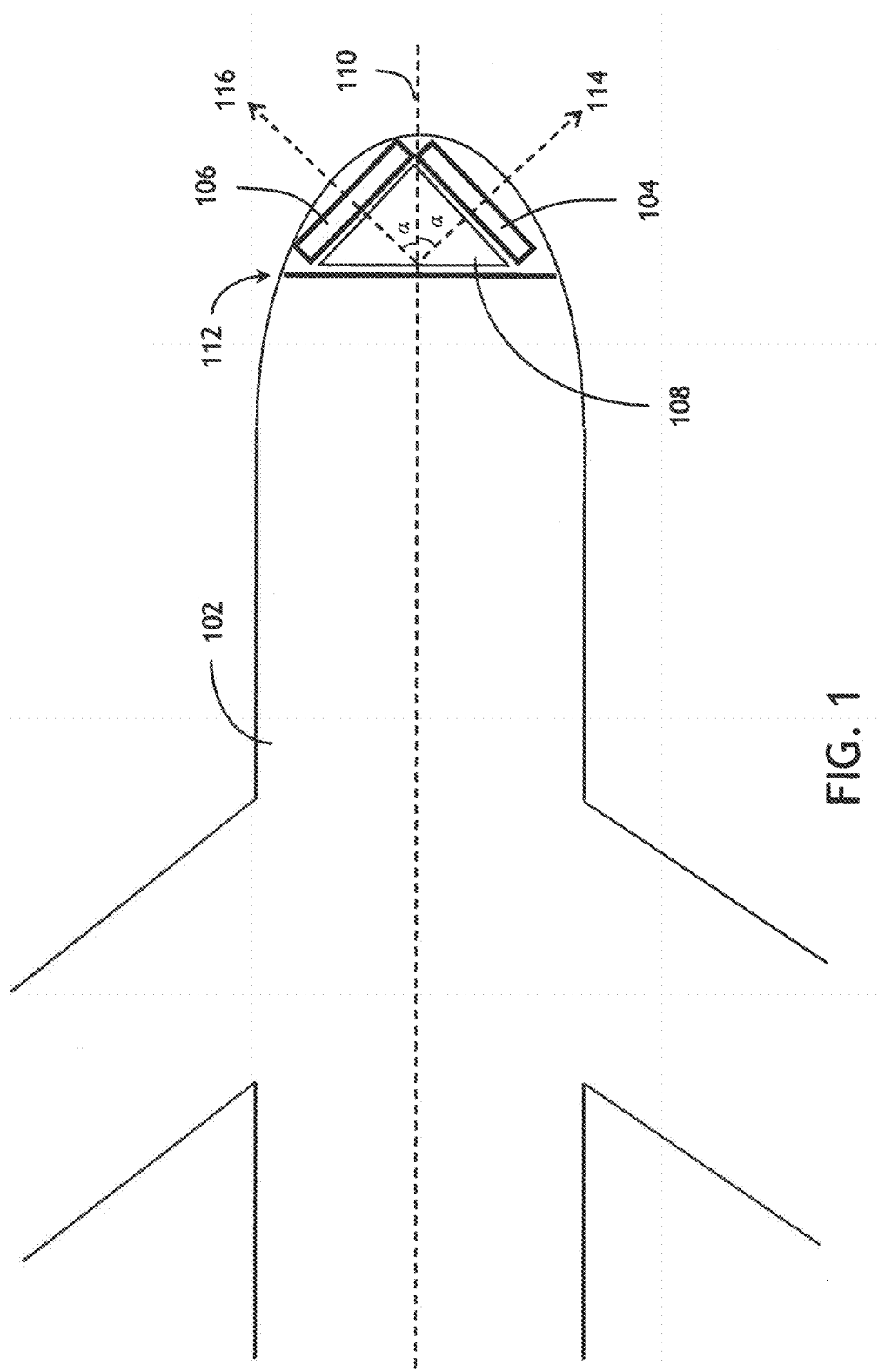
FIG. 1 is an illustration depicting a two panel AESA radar system installed in a nosecone radome of an aircraft.

Referring to FIG. 1, an illustration (a top view) depicting a two panel AESA radar system 100 installed in a nosecone radome of an aircraft 102 is shown. The radar system 100 includes a first AESA panel 104, a second AESA panel 106 and a controller 108. The AESA panels 104 and 106 are respectively positioned on the two opposing lateral sides of a longitudinal axis 110 of the aircraft 102. Furthermore, the pointing directions of the AESA panels 104 and 106 are offset from the longitudinal axis 110 in order to provide wide azimuth angles.

The pointing direction of an AESA panel refers to the direction which the panel faces. For instance, as depicted in FIG. 1, the first AESA panel 104 is pointing to direction 114 and the second AESA panel 106 is pointing to direction 116, both of which are offset from the longitudinal axis 110. In one embodiment, the pointing direction 114 of the first AESA panel 104 is offset by a predetermined angle α in a clockwise direction with respect to the longitudinal axis 110 and the pointing direction 116 of the second AESA panel 106 is offset by the same amount in a counterclockwise direction with respect to the longitudinal axis 110.

Figure 2:
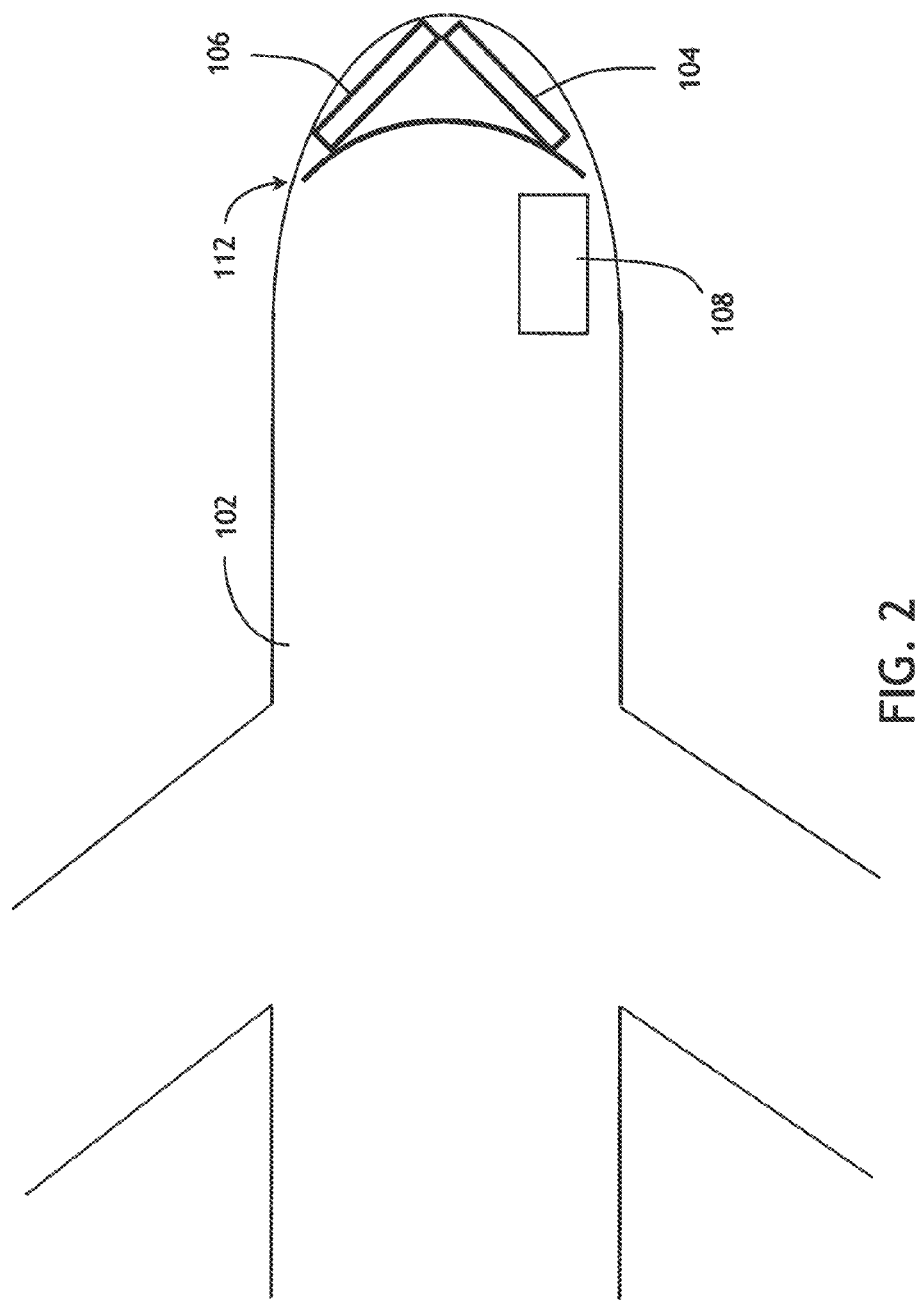
FIG. 2 is an illustration depicting a two panel AESA radar system installed in a nosecone radome of another aircraft.

The controller 108 of the radar system 100 is in communication with both AESA panels 104 and 106. The controller 108 may be implemented as a processing unit, a computing device, an integrated circuit, or any control logic (stand-alone or embedded) in communication with the panels. The controller 108 may be located within the nosecone radome if the space permits (as illustrated in FIG. 1). Alternatively, the controller 108 may be located elsewhere on the aircraft (e.g., as illustrated in FIG. 2 behind the pressure vessels/bulkheads 112) and communicate with the AESA panels 104 and 106 via wired or wireless communication means.

The controller 108 is configured for selectively activating the AESA panels 104 and 106 jointly or individually to provide wide azimuth angles. For example, the controller 108 may activate/operate the first AESA panel 104 individually to provide radar coverage towards the right side (with respect to the direction of travel) of the aircraft. The controller 108 may activate/operate the second AESA panel 106 individually to provide radar coverage towards the left side (with respect to the direction of travel) of the aircraft. Furthermore, the controller 108 may activate/operate both AESA panels 104 and 106 jointly. The joint operation (may also be referred to as the summed operation) of the AESA panels 104 and 106 forms a two-panel chevron antenna aperture, providing radar coverage towards the forward direction (with respect to the direction of travel) of the aircraft.

The radar system in accordance with the present disclosure minimizes the AESA panel count to two, therefore minimizes the overall radar system volume. The two AESA panels are utilized individually at wide azimuth angles and as a common aperture in the forward quadrant. Furthermore, the chevron placement of the two AESA panels allows the panels to be placed close to the radome as illustrated in FIGS. 1 and 2, providing a "radome filling" feature which lowers installed airframe costs and maximizes the volume/space available to other system components.

It is contemplated that the panel offset angle α for each particular radar system may be determined based on various factors. Such factors may include, but are not limited to, the desired azimuth coverage, the acceptable gain loss, the available space on the aircraft and the like. For example, the panel offset angle α may be configured to be approximately 35° in a particular configuration, allowing the two panel AESA radar system to provide a ±60° azimuth coverage (wherein the forward direction along the longitudinal axis of the aircraft is referred to as 0°).

Measurements have been taken to further evaluate the effectiveness of this exemplary configuration. It is understood that antenna apertures are generally optimized for lowest loss while the antenna beam is pointed normal to the antenna aperture surface, but they may subject to substantial off-axis impedance induced losses. Such losses may be calculated based on the equation scanloss=10 log $[\cos''(\theta)]$, wherein θ represents the angle off-axis. While the n value for antenna apertures are typically 1.4, low off-axis loss apertures have been developed with smaller n values (e.g., some low off-axis loss apertures have n=1.1).

Figure 3:
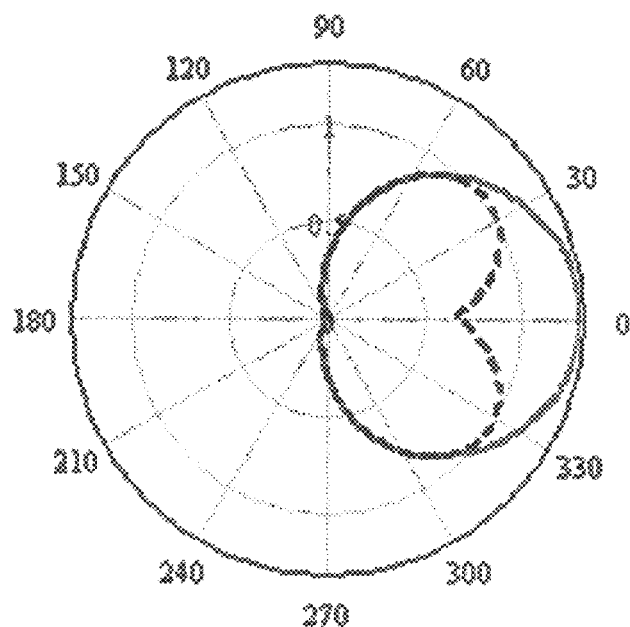
FIG. 3 is an illustration depicting a relative gain diagram of a two panel AESA radar system in accordance with the present disclosure.

FIG. 3 depicts a two-way relative gain diagram of the exemplary configuration described above when low off-axis loss apertures are utilized to implement the AESA panels. The dashed lines indicate the antenna gains when the two AESA panels operate individually, and the solid line indicates the antenna gain when the two AESA panels operate jointly. As the gain diagram indicates, the first AESA panel may be utilized individually to provide coverage from −60° to −45°. Similarly, the second AESA panel may be utilized individually to provide coverage from +45° to +60°. In addition, both panels may be utilized jointly and the summed operation may provide coverage from −45° to +45° with the desired forward gain. Such a configuration may therefore be well suited for business and regional type aircraft applications.

Figure 4:
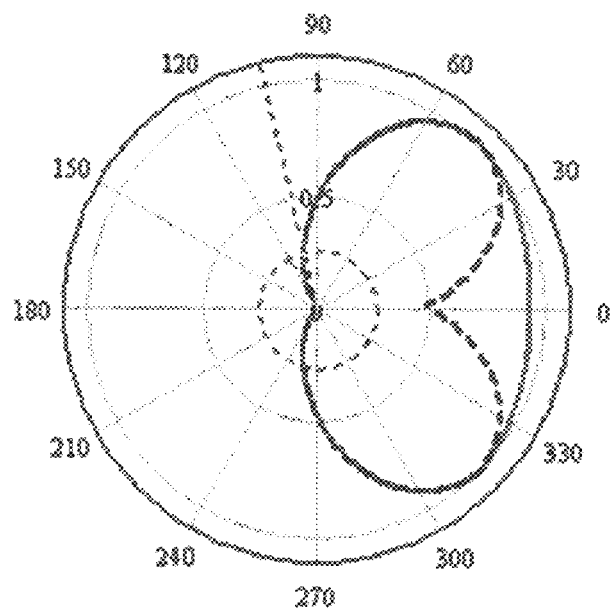
FIG. 4 is an illustration depicting a relative gain diagram of another two panel AESA radar system in accordance with the present disclosure.

However, such a configuration may not be able to provide high scan angles that certain applications may demand. For instance, the gain loss at ±90° angles as indicated in FIG. 3 may not satisfy certain applications such as air transportation or the like. FIG. 4 depicts the gain diagram of another exemplary two panel AESA radar system in accordance with the present disclosure. The panel offset angle α in this exemplary system may be approximately 45°. While gain loss (e.g., about 3 dB loop gain loss in this example) is observed when the radar system operates at ±90°, such gain losses may still be acceptable. Furthermore, the summed operation that is utilized to cover from −45° to +45° produces greater gain at bore-sight as opposed to a single panel operation (e.g., about 2.6 dB in this example), therefore allowing this radar system to effectively provide a ±90° azimuth coverage.

Figure 5:
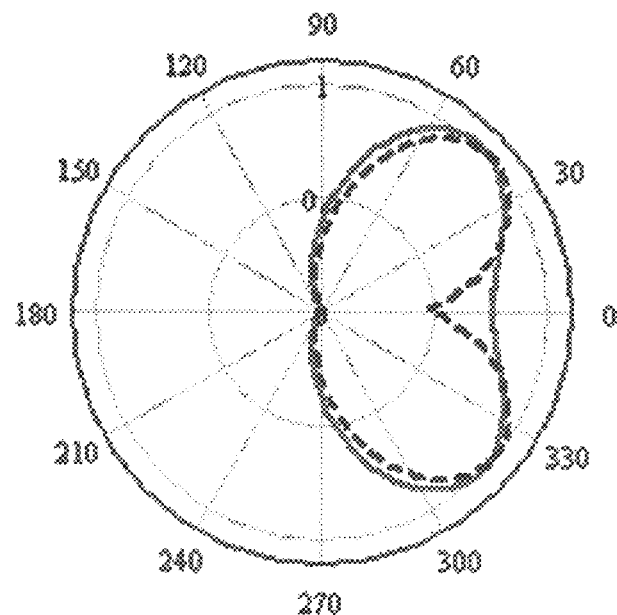
FIG. 5 is an illustration depicting a relative gain diagram of still another two panel AESA radar system in accordance with the present disclosure.

It is contemplated that radar systems in accordance with the present disclosure do not require the AESA panels to be implemented with low off-axis loss apertures. For instance, FIG. 5 depicts the gain diagram of a two panel AESA radar system with the panel offset angle α being approximately 45° (i.e., similar to the implementation depicted in FIG. 4) but with moderate off-axis loss apertures (e.g., n equals approximately 1.4). While a 1 dB loss has been observed at bore-sight compared to the previous configuration (i.e., with low loss apertures), the two panel AESA radar system with moderate off-axis loss apertures may be relatively less expensive and still be able to provide a ±90° azimuth coverage with reasonable gains.

Furthermore, the summed operation of the two panels in accordance with the present disclosure may be optimized for improved gain. Gain losses are made from two components: the off axis change in apparent antenna area and the loss caused by impedance shifts as the antenna is pointed away from its lowest loss angle. Therefore, the antenna design does not need to be optimized at the beam normal position, and the loss equation may be defined as two components: one for apparent area and one for impedance loss, as shown in the equation: scanloss=10 log [cos(θ)]+10 log [cos$^{n-1}$(θ+θ optimization)].

Figure 6:
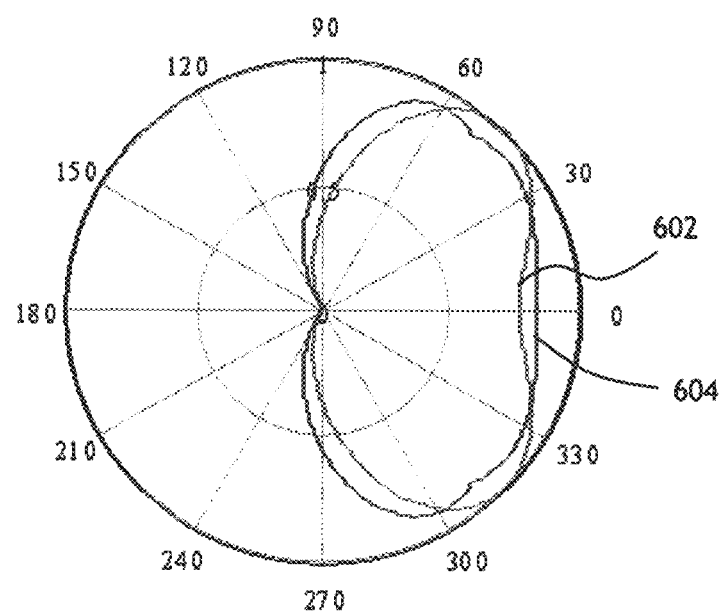
FIG. 6 is an illustration depicting a relative gain diagram of a two panel AESA radar system with impedance optimization in accordance with the present disclosure.

Using the ±90° azimuth coverage configuration as the example, the panel offset angle α for two panels with moderate off-axis loss apertures may be set to be approximately 49° (as opposed to α being 45° in the previous example), the summed operation may be utilized over ±49° range, and the impedance losses may be mitigated by optimizing impedances at 30° forward of each panel's normal position. A comparison of the gain diagrams of the 45°-offset configuration 602 (i.e., the previous example) and the 49°-offset configuration 604 is illustrated in FIG. 6. The 49° offset configuration shows improved gain at beam normal with improved gain at ±90° beam positions.

It is contemplated that the radiating elements for an optimized two panel AESA radar system may need to satisfy certain requirements. For instance, in order to maximize the volume available to other system components and to minimize the overall radar system volume, the radiating elements utilized in one embodiment must have a low profile, must be placed close to the radome, and must be integrated with the feed (to minimize radar system volume). As mentioned previously, radiating elements capable of scanning with lower off-axis losses (e.g., n equal to 1.2 or less out to 60°) may be preferable. Furthermore, the radiating elements must also meet benign RF environmental requirements, and the radiating elements must be capable of providing adequate performances as individual panels and/or combined panels as described above.

In an exemplary embodiment configured for a business or regional type aircraft, each AESA panel may include 256 radiating elements arranged in a 16×16 configuration. In an alternative embodiment configured for an air transportation type aircraft, each AESA panel may include 1024 radiating elements arranged in a 32×32 configuration. However, it is contemplated that the specific number of elements included in each AESA panel may vary for a specific application without departing from the spirit and scope of the present disclosure. Furthermore, it is understood that the specific panel offset angles α referenced above are merely exemplary. The panel offset angle α may range between 30° and 60° based on implementation constraints/requirements, and different panel offset angles may also be utilized for providing different azimuth coverage without departing from the spirit and scope of the present disclosure.

The radar system in accordance with the present disclosure minimizes the overall radar system volume. The chevron placement of the two AESA panels allows the panels to be placed close to the radome, therefore maximizes the volume/space available to other system components. Furthermore, the placement of the two AESA panels may also accommodate for a very compact radome, as illustrated in FIG. 2, which may be appreciated in aircrafts with pressure vessels/bulkheads 112 curved towards the radomes. The radar system in accordance with the present disclosure may therefore be installed in spaces where mechanically steered system may not be able to fit.

The radar system in accordance with the present disclosure may also provide additional functionalities that may be appreciated in various aircraft applications. For instance, the two receivers may be configured to allow monopulse operation in azimuth when both AESA panels are in operation. This is useful in both the air for precision imaging of the runway and for surface operation.

In addition, the two panel operation may be simultaneous and independent outside of operation in the forward quadrant for higher average power on target. Multiple simultaneous panel operation can be added by using transmitter waveforms for pulse compression that have low cross-correlations. While useful, such code usage is not sufficient. During the active transmitter pulse portion of radar operation, high level energy still leaks across from one panel to another. If a panel is in receive mode while another panel is transmitting the high level leakage from the transmitting panel will produce either a false target or be blinded to valid targets during the other transmitter's pulse duration. A successful mitigation to this interference problem is to schedule all panels to transmit at the same time. Each panel's receiver is already blanked (turned off or not used) during its associated transmitter operation. Synchronizing transmitter pulses places the interference signal from each system in the same time while receiver operation is blanked.

Furthermore, the two panel configuration in accordance with the present disclosure is not limited to aircraft applications. The two panel configuration may also be applicable to generic planar phased array aperture technologies. For example, the two panels may be offset by a predetermined angle on either side of a central axis (which corresponds to the longitudinal axis of the aircraft in the examples above). As described above, the panels may be utilized individually to provide wide azimuth angles, and they may be utilized jointly as a common antenna aperture and operate in the direction along the central axis. Such radar systems may be appreciated in various applications where spaces and/or movements may be limited or restricted.

Figure 7:
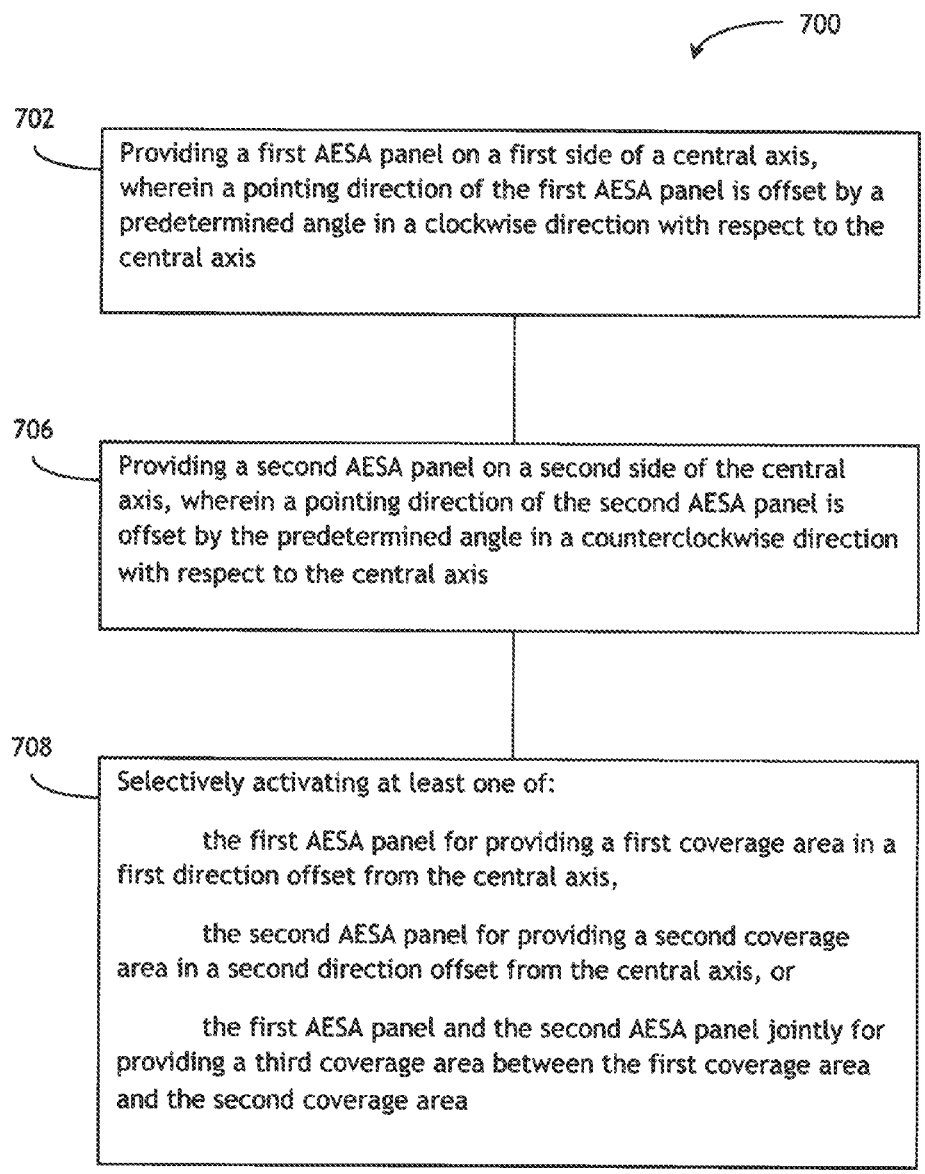
FIG. 7 is a flow chart illustrating a method for providing wide azimuth coverage utilizing AESA radars in accordance with the present disclosure.

Referring now to FIG. 7, a method 700 for providing wide azimuth coverage utilizing AESA radars is shown. Step 702 may provide a first AESA panel on a first side of a central axis, wherein the pointing direction of the first AESA panel is offset by a predetermined angle in a clockwise direction with respect to the central axis. Step 704 may provide a second AESA panel on a second side of the central axis, wherein the pointing direction of the second AESA panel is offset by the predetermined angle in a counterclockwise direction with respect to the central axis. The two AESA panels may form a chevron configuration as described above.

Step 706 may selectively activate the AESA panels individually to provide wide azimuth angles or both panels may be activated jointly. For instance, as previously described, the first AESA panel may be activated for providing a first coverage area in a first direction offset from the central axis, the second AESA panel may be activated for providing a second coverage area in a second direction offset from the central axis, and the two AESA panels may be activated together for providing a third coverage area between the first coverage area and the second coverage area.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A radar system for an aircraft, the radar system comprising:
    a pair of Active Electronically Scanned Array (AESA) panels disposed in a nosecone radome of the aircraft, the pair of AESA panels respectively positioned on two opposing lateral sides of a longitudinal axis of the aircraft, wherein a pointing direction of the first AESA panel is offset by a predetermined angle in a clockwise direction with respect to the longitudinal axis of the aircraft and a pointing direction of the second AESA panel is offset by the predetermined angle in a counterclockwise direction with respect to the longitudinal axis of the aircraft;
    a controller in communication with each of the pair of AESA panels, the controller configured for selectively switching between:
        the first AESA panel individually for providing a first coverage area in a first direction offset from the longitudinal axis of the aircraft,
        the second AESA panel individually for providing a second coverage area in a second direction offset from the longitudinal axis of the aircraft, and
        the pair of AESA panels jointly for providing a third coverage area between the first coverage area and the second coverage area.

2. The radar system of claim 1, wherein the predetermined angle ranges between 30° and 60°.

3. The radar system of claim 1, wherein the controller is configured for activating the pair of AESA panels jointly for providing a coverage area within plus/minus the predetermined angle along the longitudinal axis of the aircraft.

4. The radar system of claim 3, wherein the predetermined angle is 35°, and the controller is configured for selectively activating at least one of:
    the first AESA panel individually for providing a coverage area between −45° and −60° away from the longitudinal axis of the aircraft;
    the second AESA panel individually for providing a coverage area between 45° and 60° away from the longitudinal axis of the aircraft; and
    the pair of AESA panels jointly for providing a coverage area within ±45° along the longitudinal axis of the aircraft.

5. The radar system of claim 3, wherein the predetermined angle is 45°, and the controller is configured for selectively activating at least one of:
    the first AESA panel individually for providing a coverage area between −45° and −90° away from the longitudinal axis of the aircraft;
    the second AESA panel individually for providing a coverage area between 45° and 90° away from the longitudinal axis of the aircraft; and
    the pair of AESA panels jointly for providing a coverage area within ±45° along the longitudinal axis of the aircraft.

6. The radar system of claim 1, wherein the controller is further configured for activating both the first and the second AESA panels, wherein the first and the second AESA panels operate simultaneously and independently for providing the first and the second converge areas, respectively, and wherein transmitter pulses of the first and the second AESA panels are synchronized to mitigate potential interferences between the first and the second AESA panels.

7. The radar system of claim 1, wherein the AESA panels are implemented utilizing low off-axis loss radiating elements.

8. A radar system, comprising:
    a pair of Active Electronically Scanned Array (AESA) panels, the pair of AESA panels respectively positioned on two opposing sides of a central axis, wherein a pointing direction of the first AESA panel is offset by a predetermined angle in a clockwise direction with respect to the central axis and a pointing direction of the second AESA panel is offset by the predetermined angle in a counterclockwise direction with respect to the central axis;
    a controller in communication with each of the pair of AESA panels, the controller configured for selectively switching between:
        the first AESA panel individually for providing a first coverage area in a first direction offset from the central axis,
        the second AESA panel individually for providing a second coverage area in a second direction offset from the central axis, and
        the pair of AESA panels jointly for providing a third coverage area between the first coverage area and the second coverage area.

9. The radar system of claim 8, wherein the predetermined angle ranges between 30° and 60°.

10. The radar system of claim 8, wherein the controller is configured for activating the pair of AESA panels jointly for providing a coverage area within plus/minus the predetermined angle along the central axis.

11. The radar system of claim 10, wherein the predetermined angle is 35°, and the controller is configured for selectively activating at least one of:
    the first AESA panel individually for providing a coverage area between −45° and −60° away from the central axis;
    the second AESA panel individually for providing a coverage area between 45° and 60° away from the central axis; and
    the pair of AESA panels jointly for providing a coverage area within ±45° along the central axis.

12. The radar system of claim 10, wherein the predetermined angle is 45°, and the controller is configured for selectively activating at least one of:
    the first AESA panel individually for providing a coverage area between −45° and −90° away from the central axis;
    the second AESA panel individually for providing a coverage area between 45° and 90° away from the central axis; and
    the pair of AESA panels jointly for providing a coverage area within ±45° along the central axis.

13. The radar system of claim 8, wherein the controller is further configured for activating both the first and the second AESA panels, wherein the first and the second AESA panels operate simultaneously and independently for providing the first and the second converge areas, respectively, and wherein transmitter pulses of the first and the second AESA panels are synchronized to mitigate potential interferences between the first and the second AESA panels.

14. The radar system of claim 8, wherein the AESA panels are implemented utilizing low off-axis loss radiating elements.

15. A method for providing wide azimuth coverage utilizing Active Electronically Scanned Array (AESA) radars, the method comprising:
   providing a first AESA panel on a first side of a central axis, wherein a pointing direction of the first AESA panel is offset by a predetermined angle in a clockwise direction with respect to the central axis;
   providing a second AESA panel on a second side of the central axis, wherein a pointing direction of the second AESA panel is offset by the predetermined angle in a counterclockwise direction with respect to the central axis; and
   switching between:
      the first AESA panel for providing a first coverage area in a first direction offset from the central axis,
      the second AESA panel for providing a second coverage area in a second direction offset from the central axis, and
      the first AESA panel and the second AESA panel jointly for providing a third coverage area between the first coverage area and the second coverage area.

16. The method of claim 15, wherein the predetermined angle ranges between 30° and 60°.

17. The method of claim 15, wherein the first AESA panel and the second AESA panel are activated jointly for providing a coverage area within plus/minus the predetermined angle along the central axis.

18. The method of claim 17, wherein the predetermined angle is 35°, and the method further comprises:
   activating the first AESA panel individually for providing a coverage area between −45° and −60° away from the central axis;
   activating the second AESA panel individually for providing a coverage area between 45° and 60° away from the central axis; and
   activating the first AESA panel and the second AESA panel jointly for providing a coverage area within ±45° along the central axis.

19. The method of claim 17, wherein the predetermined angle is 45°, and the method further comprises:
   activating the first AESA panel individually for providing a coverage area between −45° and −90° away from the central axis;
   activating the second AESA panel individually for providing a coverage area between 45° and 90° away from the central axis; and
   activating the first AESA panel and the second AESA panel jointly for providing a coverage area within ±45° along the central axis.

20. The method of claim 15, wherein the switching step further includes: activating both first AESA panel and the second AESA panel, wherein the first and the second AESA panels operate simultaneously and independently for providing the first and the second converge areas, respectively, and wherein transmitter pulses of the first and the second AESA panels are synchronized to mitigate potential interferences between the first and the second AESA panels.

\* \* \* \* \*